(12) United States Patent
Huang

(10) Patent No.: US 8,276,300 B2
(45) Date of Patent: Oct. 2, 2012

(54) DISPLAY DEVICE HAVING DETACHABLE DECORATIVE MEMBER

(75) Inventor: Wen-Hung Huang, Tucheng (TW)

(73) Assignee: Hannspree, Inc., Taipei (TW)

( * ) Notice: Subject to any disclaimer, the term of this patent is extended or adjusted under 35 U.S.C. 154(b) by 64 days.

(21) Appl. No.: 12/805,980

(22) Filed: Aug. 27, 2010

(65) Prior Publication Data

US 2011/0283579 A1 Nov. 24, 2011

(30) Foreign Application Priority Data

May 21, 2010 (TW) ................................ 99116276 A

(51) Int. Cl.
*A47G 1/06* (2006.01)
(52) U.S. Cl. ............. 40/799; 40/798; 24/494; 24/535
(58) Field of Classification Search .............. 40/322, 40/611.12, 658, 764, 781, 783, 787, 799; 24/535, 494
See application file for complete search history.

(56) References Cited

U.S. PATENT DOCUMENTS

| | | | | |
|---|---|---|---|---|
| 2,521,558 A * | 9/1950 | Alvarez | | 40/725 |
| 2,777,232 A * | 1/1957 | Kulicke et al. | | 40/780 |
| 3,451,153 A * | 6/1969 | Dohanyos | | 40/741 |
| 3,722,121 A * | 3/1973 | Olczewski | | 40/799 |
| 4,107,897 A * | 8/1978 | Ullman, Jr. | | 52/800.12 |
| 4,388,747 A * | 6/1983 | Plummer | | 24/535 |
| 4,986,013 A * | 1/1991 | Pollack | | 40/783 |
| 5,174,054 A * | 12/1992 | Politi | | 40/737 |
| 5,438,778 A * | 8/1995 | Komamura | | 40/783 |
| 5,683,018 A * | 11/1997 | Sullivan et al. | | 223/85 |
| 6,865,832 B1 * | 3/2005 | Goldman | | 40/322 |
| 7,673,409 B2 * | 3/2010 | Pitcher et al. | | 40/617 |
| 2003/0019137 A1 * | 1/2003 | Giustini et al. | | 40/322 |
| 2008/0178506 A1 * | 7/2008 | Garfinkle | | 40/658 |

* cited by examiner

*Primary Examiner* — Lesley D Morris
*Assistant Examiner* — Christopher e Veraa
(74) *Attorney, Agent, or Firm* — Bacon & Thomas, PLLC

(57) ABSTRACT

The present invention is to provide a display device, which comprises a display body having two opposite sides adjacent to a periphery thereof and each formed with at least one first positioning element respectively, and at least one detachable decorative member made of an elastic material and formed with a second positioning element in two opposite sides adjacent to two end edges thereof respectively. When the second positioning element is inserted into and engaged with the first positioning element corresponding thereto, the elastic deformation force of the decorative member can generate a clamping force for enabling the second positioning element to firmly clamp the first positioning element, protecting the periphery of the display body from being broken due to external impact or abrasion, using the decorative member as an elastic cushioning for packing the display body into a packing box, and reducing the use of packing materials.

9 Claims, 4 Drawing Sheets

DISPLAY DEVICE HAVING DETACHABLE DECORATIVE MEMBER

FIELD OF THE INVENTION

The present invention relates to a display device, more particularly to a display device having at least one detachable decorative member installed onto a display body of the display device. It can efficiently protect periphery of the display body from external impact or abrasion, and enabling user to easily detach the decorative member from the display body, integrally pack the decorative member and the display body together into a packing box. The decorative member acts as an elastic cushioning for the display body when transporting the display device, therefore reduces the use of packing foam material for achieving purpose of decreasing volume of the packing box and meeting environmental protection trend of reducing packing material.

BACKGROUND OF THE INVENTION

Recently, with the rapid development of economy, the life of modern people becomes wealthy day by day. Except for food and clothing, people also start to pursue better quality of life and pay more attention to the material and sensual enjoyment. For example, display devices can be used to play various multimedia video and audio or to show various data and information. Display devices can rapidly and conveniently satisfy various needs of users, such as design work, entertainment and learning, while providing immediate visual sensual enjoyment to the users. Thus, display devices can enhance the quality of users' life, so as to gradually become essentials of daily life of human. When a normal user purchases and selects a display device, the user generally pays attention to the entire appearance and texture of the display device. Therefore, when the manufacturer of the display device packs and transports the display device, the manufacturer usually places the display device into a packing box and fills a large number of packing foam material (such as foam, Styrofoam, EPE, etc.) into a space between the display device and the packing box, in order to protect the entire display device for showing the value and texture of the display device, and to prevent the display device from being directly impacted and damaged by an external force. However, for the manufacturer, the foregoing packing process wastes too much time to pack the display device by much packing material and also the cost of the packing material. Meanwhile, because the considerable packing material can not be reduced, thus the display device packed with the excessive packing material can not meet global environmental protection trends. As a result, some users focusing on environmental protection awareness don't want to purchase and use this kind of display device, also lower the market competitiveness of the manufacturer.

Furthermore, due to frequent business in recent years, modern people start to apply the display device to related fields, such as multimedia, business management or mass communication, so as to play related multimedia video and audio information or to show various data and information in offices or homes, even to show multimedia video and audio information in stores or outdoor places for attracting people. Thus, the display devices are widely accepted by the businesses and users nowadays, and applied to offices, homes, stores, shops, outdoor places and etc. In other words, those places where people gather always need display devices, so that the display devices are very important. However, because a display device may be mounted in a place where people frequently move (such as open or semi-open space), an outer housing of the display device may be deformed or broken due to the material fatigue caused by various external factors (such as high/low temperature, wind, rain, moisture or ultraviolet light) under long-term use. Meanwhile, the display device may be impacted or damaged by the frequently use of people, so produces scratches and damages on its outer housing. As a result, the external wind, rain, moisture or ultraviolet light may easily invade into the outer housing from a broken gap thereof, so that inner mechanism or components of the display device will be directly and long-term affected by the external wind, rain, moisture or ultraviolet light to cause various problems including oxidation, brittleness, corrosion, aging or short circuit, resulting in shortening the life of the display device or damaging the display device.

As described above, an outer housing of a traditional display device and a main body thereof are integrated into one piece. When material fatigue occurs on the outer housing of the display device after long-term use or scratches and damages due to impact or abrasion, the user can not replace the outer housing by himself/herself, or optionally use another outer housing with different appearance.

As a result, it is important for designers and related manufacturers to think how to develop an innovative display device installed with a plurality of detachable decorative members for a user to rapidly install the detachable decorative members on the display device by himself/herself for the purpose of protecting the display device; to rapidly detach the detachable decorative members from the display device by himself/herself for the purpose of optionally changing the appearance of the display device; or to use different detachable decorative members for the purpose of preventing from material fatigue of the outer housing of the display device to extend the life of the display device, so that the foregoing problems can be efficiently overcome.

It is therefore tried by the inventor to develop a display device having detachable decorative member to solve the problems existing in the traditional display device, as described above.

BRIEF SUMMARY OF THE INVENTION

A primary object of the present invention is to provide a display device having a detachable decorative member, which comprises a display body and at least one said decorative member, wherein the display body has two opposite sides adjacent to a periphery thereof, and each of the two opposite sides is formed with at least one first positioning element (such as a recessed groove/slot or a protrusion/post), respectively. The decorative member is made of an elastic material (such as plastic), and has two end edges of two opposite sides opposite to each other. The decorative member is formed with a second positioning element (such as a protrusion/post or a recessed groove/slot) in the two opposite sides adjacent to the two end edges, respectively. The second positioning element can be inserted into and engaged with the first positioning element, while the number of the second positioning element is matched with that of the first positioning element. When the decorative member is installed onto the display body, the two end edges of the two opposite sides of the decorative member can provide an elastic deformation force itself to allow the insertion and engagement between the first and second positioning elements. As a result, a user can position the two end edges of the decorative member corresponding to the second positioning element onto the two opposite sides of the display body adjacent to the periphery thereof, so as to finish the insertion and engagement between the first and second positioning elements. Meanwhile, the elastic deformation force provided by the decorative member itself can generate a clamping force toward the two opposite sides of the display body, so that the two end edges of the two opposite sides of the decorative member corresponding to the second positioning element can firmly clamp the two opposite sides of the display body adjacent to the periphery thereof. Therefore, when the decorative member and the display body are installed into one unit, an outer surface of the decorative member can efficiently protect the periphery of the display body from being distorted, deformed or broken due to external impact or abrasion, and prevents wind, rain, moisture or ultraviolet light from invading into the display body from a gap or a crack on the periphery thereof to affect the life span of the display body or ruin it.

A secondary object of the present invention is to provide a display device having a detachable decorative member, wherein the decorative member is made of an elastic material, so that the manufacture of the display device can directly and integrally pack the decorative member and the display body, wherein the decorative member can be used as an elastic cushioning for the display body, so as to reduce the use of the packing materials for the purpose of decreasing the volume of the packing box and meeting the environmental protection trend of reducing the packing material.

BRIEF DESCRIPTION OF THE SEVERAL VIEWS OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
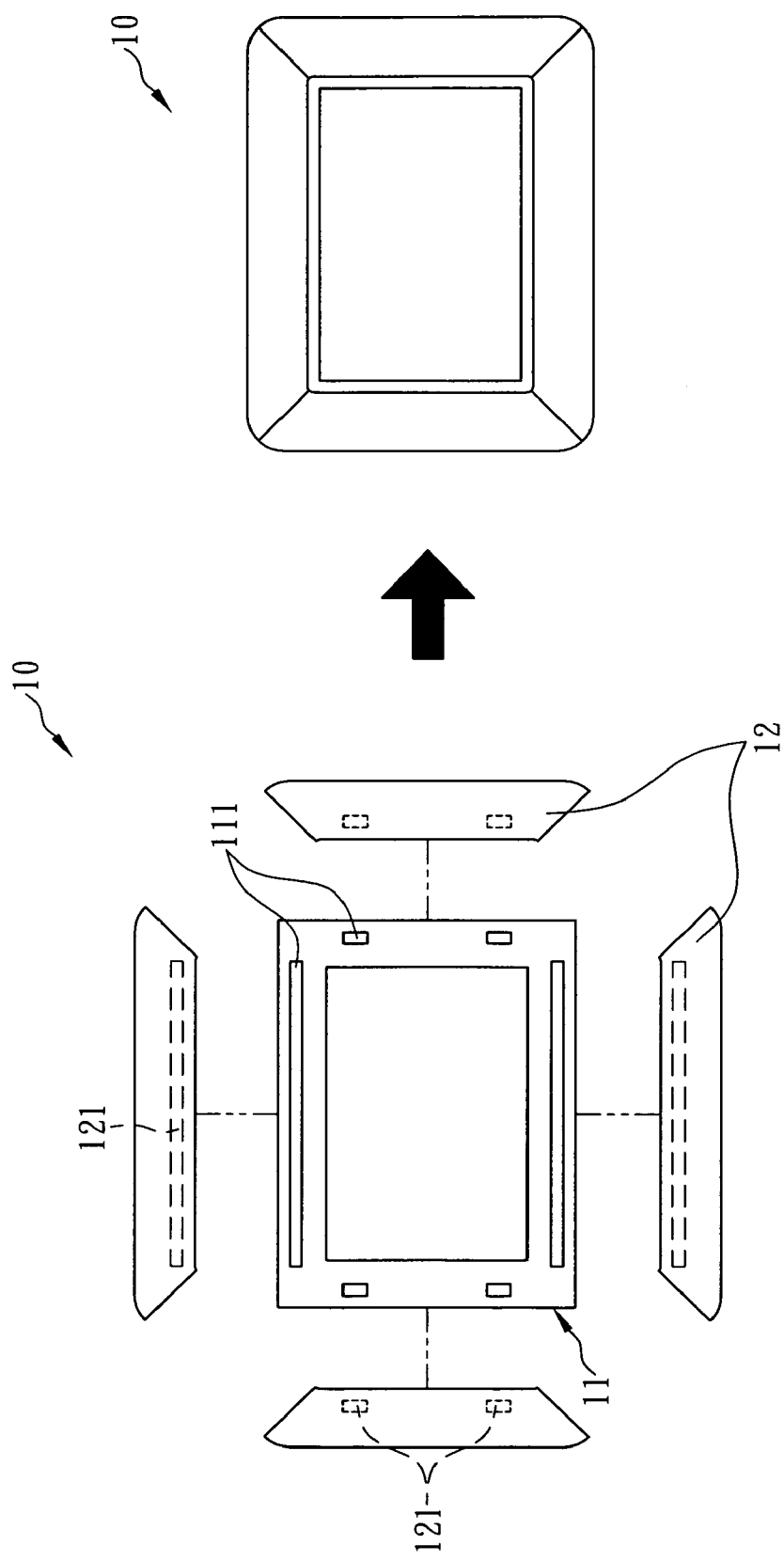
FIG. 1 is a front view of a display device having detachable decorative member according to a first preferred embodiment of the present invention.
Figure 2:
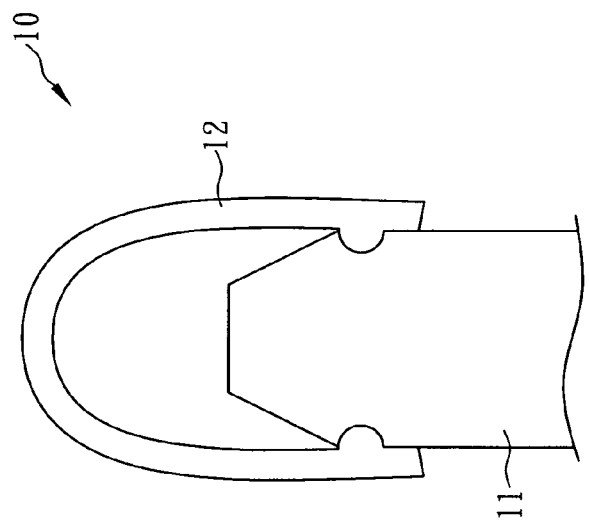
FIG. 2 is a partial cross-sectional view of the display device having detachable decorative member according to the first preferred embodiment of the present invention.
Figure 2:
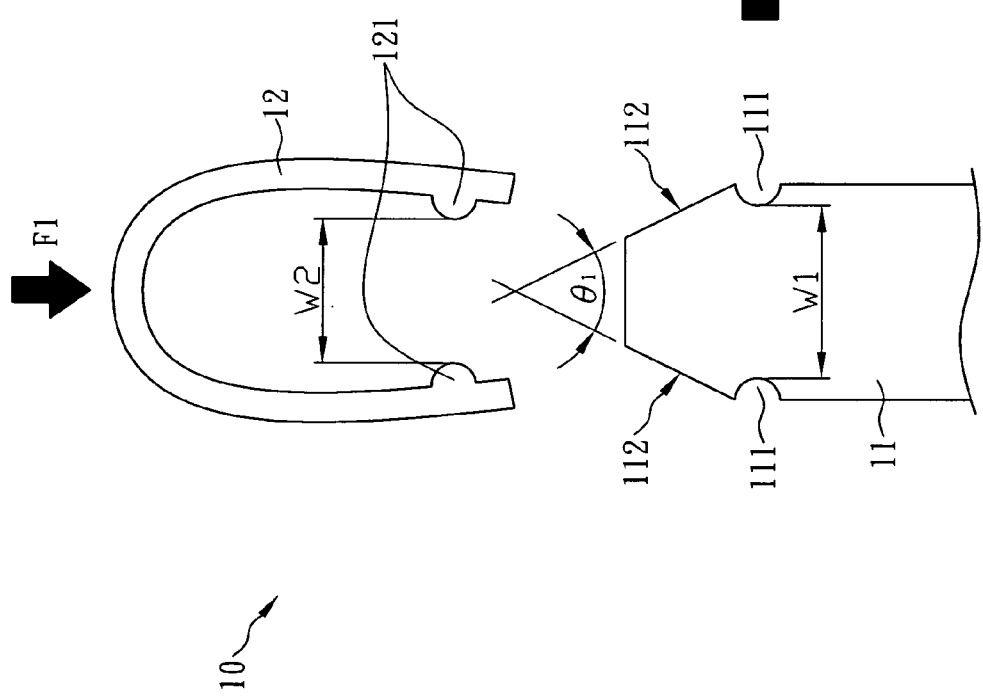

The present invention is related to a display device having one or more detachable decorative members. Referring to FIGS. 1 and 2, according to a first preferred embodiment of the present invention, a display device 10 comprises a display body 11 and a plurality of decorative members 12, wherein the display body 11 has two opposite sides adjacent to a periphery thereof, and each of the two opposite sides is formed with at least one first positioning element 111 which is preferably a recessed groove, respectively. A predetermined thickness W1 is defined between two of the corresponding first positioning elements 111. Furthermore, each of the decorative members 12 is made of an elastic material. In the embodiment, the decorative member 12 is preferably made of plastic, and has two opposite sides opposite to each other. The decorative member 12 is formed with a second positioning element 121 on a position adjacent to each of the two end edges of the two opposite sides. Each of the second positioning elements 121 is preferably a protrusion having a protruded profile matched with a recessed profile of each of the first positioning elements 111. Thus, the second positioning elements 121 protruded from the two opposite sides of the decorative member 12 adjacent to the two end edges thereof can be inserted into and engaged with the first positioning elements 111 of the display body 11, respectively, while the number of the second positioning elements 121 is matched with that of the first positioning elements 111. A predetermined gap W2 is defined between two of the corresponding second positioning elements 121, wherein the predetermined gap W2 is equal to or smaller than the predetermined thickness W1. Moreover, the profile, position or other factor of the first positioning elements 111 and the second positioning elements 121 are not limited to the foregoing embodiment, and can be varied according to manufacture needs of manufacturers and actual desires of users. In another embodiment of the present invention, the first positioning elements 111 can be a protrusion, while each of the second positioning elements 121 can be a recessed groove or slot having a recessed profile matched with a protruded profile of each of the first positioning elements 111. As long as a first positioning element 111 and a second positioning element 121 have profiles matched with each other and can be engaged with each other, the first positioning element 111 and the second positioning element 121 can be applied to the present invention, without limiting to the foregoing embodiment.

Referring to FIG. 2, in a case that the decorative member 12 is installed onto the display body 11, the decorative member 12 can provide an elastic deformation force itself to allow the insertion and engagement between the second positioning elements 121 and the first positioning elements 111. As a result, a user can position the two end edges of the decorative member 12 corresponding to the second positioning elements 121 onto the two opposite sides of the display body 11 adjacent to the periphery thereof, so as to finish the insertion and engagement between the second positioning elements 121 and the first positioning elements 111. Meanwhile, the elastic deformation force provided by the decorative member 12 itself can generate a clamping force toward the two opposite sides of the display body 11, so that the two end edges of the two opposite sides of the decorative member 12 corresponding to the second positioning elements 121 can firmly clamp the two opposite sides of the display body 11 adjacent to the periphery thereof.

Therefore, referring back to FIGS. 1 and 2, when the decorative member 12 and the display body 11 are installed into one unit, an outer surface of the decorative member 12 can efficiently protect the periphery of the display body 11 from being distorted, deformed or damaged due to external impact or abrasion, and can efficiently prevent the problem of wind, rain, moisture or ultraviolet light may invade into the display body 11 from a gap or a crack on the periphery thereof to affect the life span of the display body 11 or damage it. In addition, when the display device 10 uses the detachable decorative member 12 of the present invention, the user can rapidly detach the decorative member 12 from the display body 11 by himself/herself, and then select another decorative member 12 having different appearance or design. As a result, the present invention can carry out the purpose of optionally changing the appearance of the display device 10 by the user.

Figure 3:
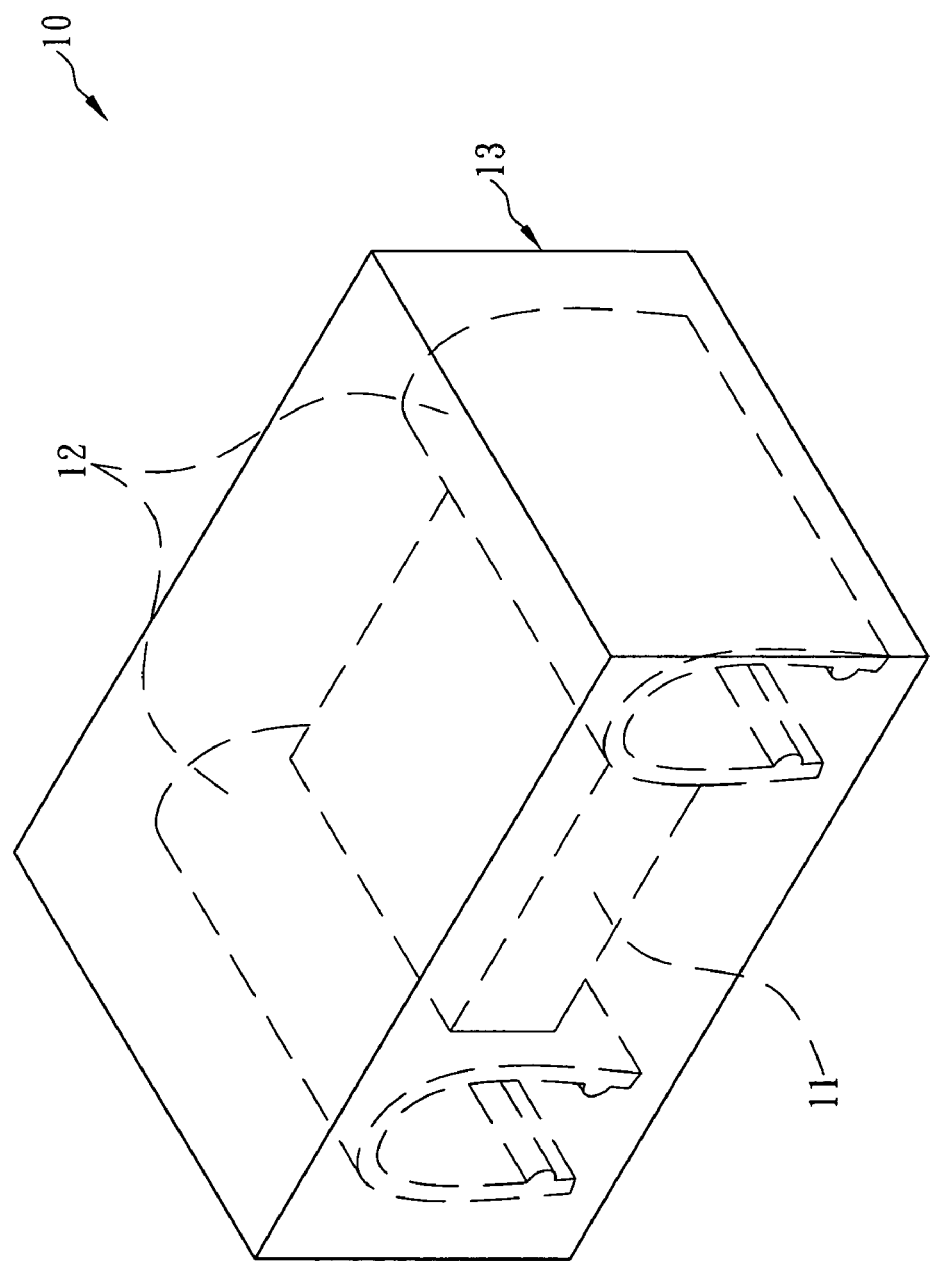
FIG. 3 is an installation view of packing the display device having detachable decorative member according to the first preferred embodiment of the present invention.

Furthermore, for the traditional display device, the manufacture generally packs a large number of foam material (such as foam, Styrofoam, EPE, etc.) into a space between the traditional display device and a packing box, in order to prevent the display device from being directly impacted and damaged by an external force, so that a product of the traditional display device packed with the excessive packing material can not meet related environmental protection requirements. Referring to FIG. 3, the decorative member 12 of the present invention is made of the elastic material, so that the manufacture of the display device 10 can directly and integrally pack the decorative member 12 and the display body 11 into a packing box 13, wherein the decorative member 12 can be used as an elastic cushioning for the display body 11, so as to reduce the use of the packing foam material for the purpose of decreasing the volume of the packing box 13 and meeting the environmental protection requirement. As a result, the manufacture can reduce the cost of the packing material and saving the manpower and time of manually packing the display body 11.

Moreover, referring back to FIG. 2, in the embodiment, each of the two end edges of the two opposite sides of the display body 11 adjacent to the periphery thereof is formed with an inclined surface 112, wherein each of the two inclined surfaces 112 has a tangent line, and a first inclined angle $\theta 1$ is defined between the two tangent lines of the two inclined surfaces 112. Thus, the user can abut the two end edges of the decorative member 12 corresponding to the second positioning elements 121 against the two inclined surfaces 112 of the display body 11 adjacent to the periphery thereof, respectively, and then apply an external force F1 to the decorative member 12 along a direction toward the display body 11. After this, if the external force F1 applied to the decorative member 12 by the user can sufficiently overcome the elastic deformation force of the decorative member 12 itself, the two end edges of the decorative member 12 corresponding to the second positioning elements 121 can slide along the two inclined surfaces 112 in a direction toward the display body 11, respectively. When the second positioning elements 121 on the two opposite sides of the decorative member 12 slide to a position corresponding to the first positioning elements 111 on the display body 11, the second positioning elements 121 will be inserted into the first positioning elements 111, so that the two end edges of the two opposite sides of the decorative member 12 corresponding to the second positioning elements 121 can firmly clamp the two opposite sides of the display body 11 adjacent to the periphery thereof.

Figure 4:
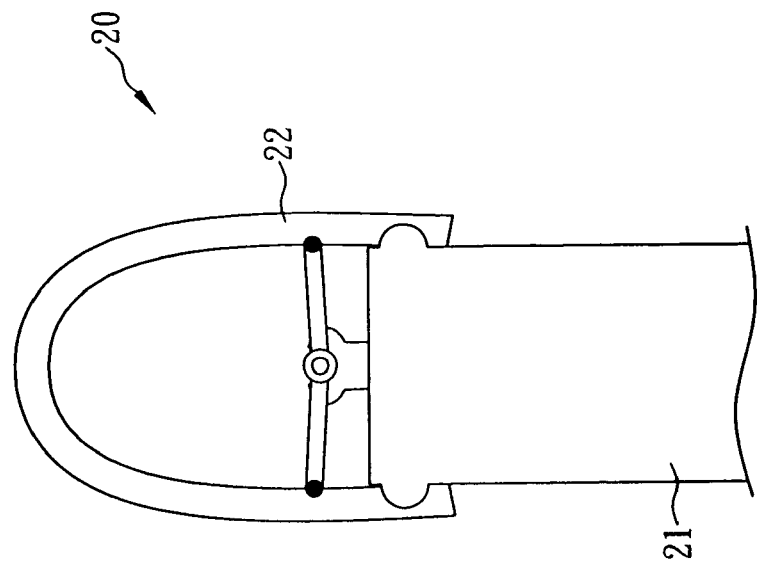
FIG. 4 is a partial cross-sectional view of a display device having detachable decorative member according to a second preferred embodiment of the present invention.
Figure 4:
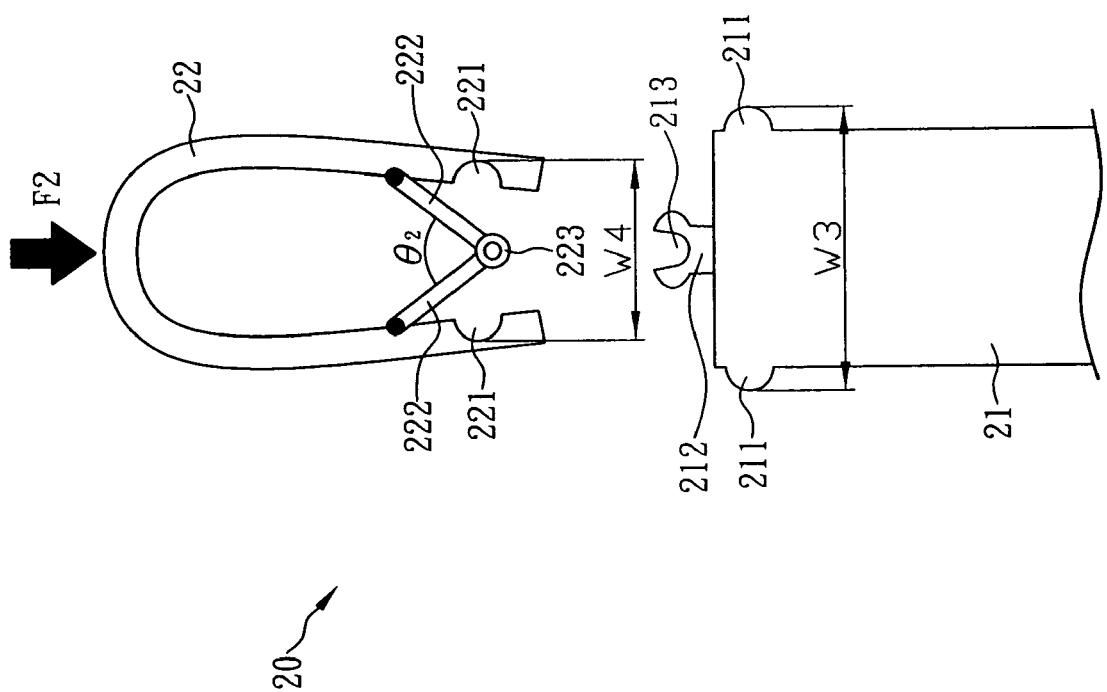

Referring to FIG. 4, in a second preferred embodiment of the present invention, a display device 20 comprises a display body 21 and a plurality of decorative member 22, wherein the display body 21 has two opposite sides adjacent to a periphery thereof, and each of the two opposite sides is formed with at least one first positioning element 211 which is preferably a protrusion, respectively. A predetermined thickness W3 is defined between two of the corresponding first positioning elements 211 on the two opposite sides of the display body 21. Furthermore, the display body 21 is provided with a support member 212, wherein the support member 212 has a first end fixedly connected to a position of the periphery of the display body 21 corresponding to the decorative member 22, and a second end formed with a receiving recess 213. The decorative member 22 has two opposite sides, while a position adjacent to each of two end edges of the two opposite sides of the decorative member 22 is formed with a second positioning element 221 which is preferably a recessed groove or slot having a recessed profile matched with a protruded profile of each of the first positioning elements 211. Thus, the first positioning elements 211 protruded on the two opposite sides of the display body 21 adjacent to the periphery thereof can be inserted into the second positioning elements 221 recessed in the two opposite sides of the decorative member 22. A predetermined gap W4 is defined between two of the corresponding second positioning elements 221 on the two opposite sides of the decorative member 22, wherein the predetermined gap W4 is equal to or smaller than the predetermined thickness W3. Furthermore, a position of each of the two opposite sides of the decorative member 22 adjacent to the second positioning elements 221 is pivotally connected to a first end of a shaft 222, respectively, while a second end of each of the two shafts 222 is pivotally connected to each other by a pivot 223. The profile of the pivot 223 is matched with that of the receiving recess 213 of the support member 212, so that the pivot 223 can be received in the receiving recess 213. In addition, an angle $\theta 2$ is defined between two axial lines of the two shafts 222. Thus, the user can abut the pivot 223 in the decorative member 22 against the receiving recess 213 on the second end of the support member 212 to position the pivot 223 into the receiving recess 213, and then apply an external force F2 to the decorative member 22 along a direction toward the display body 21. At that time, the pivot 223 is pushed by a counterforce transmitted from the support member 212, and then gradually moved into the decorative member 22. Therefore, the counterforce from the support member 212 is then transmitted outward to the two end edges of the two opposite sides of the decorative member 22 through each of the shafts 222. In a case that the counterforce from the support member 212 can sufficiently overcome the elastic deformation force of the decorative member 22 itself, the two end edges of the decorative member 22 corresponding to the second positioning elements 221 will be gradually away from each other, and then slide toward the first positioning elements 211 along the two opposite sides of the display body 21 adjacent to the periphery thereof. When the second positioning elements 221 on the two opposite sides of the decorative member 22 slide to a position of the display body 21 corresponding to the first positioning elements 211, the first positioning elements 211 will be inserted into the second positioning elements 221, and the elastic deformation force provided by the decorative member 22 itself can generate a clamping force toward the two opposite sides of the display body 21 adjacent to the periphery thereof, so that the two end edges of the two opposite sides of the decorative member 22 corresponding to the second positioning elements 221 can firmly clamp the two opposite sides of the display body 21 adjacent to the periphery thereof.

As described above, terms and descriptions used in the foregoing embodiments, such as the profile, position or other descriptions of the first positioning elements and the second positioning elements, are only preferred embodiments of the present invention, and the present invention is not limited thereto. It is understood that many changes and modifications to the described embodiments can be carried out without departing from the scope and the spirit of the invention that is intended to be limited only by the appended claims.

What is claimed is:

1. A display device, comprising:
   a display body having two opposite sides adjacent to a periphery thereof, each of the two opposite sides being formed with at least one first positioning element, respectively;
   at least one decorative member, said decorative member having two opposite sides opposite to each other and being formed with a second positioning element on a position adjacent to each of two end edges of the two opposite sides, respectively; wherein said decorative member can deform itself to allow insertion and engagement between the second positioning elements and the first positioning elements when the decorative member is installed onto the display body; and
   wherein a position of each of the two opposite sides of the decorative member adjacent to the second positioning elements is pivotally connected to a first end of a shaft, respectively, while a second end of each of the two shafts is pivotally connected to each other by a pivot, and wherein an angle θ2 is defined between two axial lines of the two shafts.

2. The display device according to claim 1, wherein the decorative member is made of an elastic material.

3. The display device according to claim 1, wherein the decorative member is packed around the display body and thus used as an elastic cushioning for the display body when the display body and the decorative member are packed into a packing box.

4. The display device according to claim 1, wherein each of the two end edges of the two opposite sides of the display body adjacent to the periphery thereof is formed with an inclined surface, and an angle θ1 is defined between two tangent lines of the two inclined surfaces.

5. The display device according to claim 1, wherein the display body is provided with a support member on a position of the periphery of the display body corresponding to each of the decorative members, the support member having a first end fixedly connected to the display body and a second end formed with a receiving recess that has a profile matched with that of the pivot.

6. The display device according to claim 1, wherein the first positioning element is a protrusion.

7. The display device according to claim 6, wherein the second positioning element is a recessed groove or slot, and the second positioning element has a profile matched with that of the first positioning element.

8. The display device according to claim 1, wherein the first positioning element is a recessed groove or slot.

9. The display device according to claim 8, wherein the second positioning element is a protrusion, and the second positioning element has a profile matched with that of the first positioning element.

* * * * *